(12) United States Patent
Kim (10) Patent No.: US 8,060,618 B2
(45) Date of Patent: Nov. 15, 2011

(54) METHOD AND SYSTEM FOR TRANSMITTING DATA USING TRAFFIC DISTRIBUTION FOR EACH LINE BETWEEN SERVER AND CLIENT CONNECTED BY VIRTUAL INTERFACE

(75) Inventor: Dong-han Kim, Seoul (KR)

(73) Assignee: Nexg Co., Ltd., Seoul (KR)

( * ) Notice: Subject to any disclaimer, the term of this patent is extended or adjusted under 35 U.S.C. 154(b) by 139 days.

(21) Appl. No.: 12/527,414

(22) PCT Filed: Aug. 19, 2008

(86) PCT No.: PCT/KR2008/004807
§ 371 (c)(1),
(2), (4) Date: Aug. 14, 2009

(87) PCT Pub. No.: WO2009/041762
PCT Pub. Date: Apr. 2, 2009

(65) Prior Publication Data
US 2010/0121910 A1 May 13, 2010

(30) Foreign Application Priority Data

Sep. 28, 2007 (KR) .................. 10-2007-0097715

(51) Int. Cl.
G06F 15/173 (2006.01)
G06F 11/00 (2006.01)
(52) U.S. Cl. ........................ 709/226; 370/229
(58) Field of Classification Search .............. 709/203, 709/223–226, 230–235; 370/229–253
See application file for complete search history.

(56) References Cited

U.S. PATENT DOCUMENTS

| 6,618,761 B2 * | 9/2003 | Munger et al. ............... 709/241 |
| 7,751,404 B2 * | 7/2010 | Pullen et al. ................. 370/394 |
| 2003/0026290 A1 * | 2/2003 | Umayabashi ................ 370/468 |
| 2003/0081582 A1 * | 5/2003 | Jain et al. ...................... 370/338 |
| 2005/0076136 A1 * | 4/2005 | Cho et al. ..................... 709/231 |
| 2006/0149852 A1 * | 7/2006 | Schollmeier et al. ......... 709/238 |

OTHER PUBLICATIONS

WIPO, International Search Report for International Application No. PCT/KR2008/004807.

* cited by examiner

Primary Examiner — Glenton B Burgess
Assistant Examiner — Shirley Zhang
(74) Attorney, Agent, or Firm — Intellectual Property Law Group LLP

(57) ABSTRACT

The present invention discloses a method comprising a first step of the client transmitting a bandwidth test request signal to the server; a second step of the server transmitting a test request approval signal to the client; a third step of the client conducting a bandwidth test for respective lines; a fourth step of the client transmitting results of the bandwidth test to the server; a fifth step of the server setting first traffic distribution weights; a sixth step of the client setting second traffic distribution weights; and a seventh step of the server distributing data to respective lines depending on the first traffic distribution weights and transmitting the distributed data to the client and the client distributing data to respective lines depending on the second traffic distribution weights and transmitting the distributed data to the server.

10 Claims, 5 Drawing Sheets

N : total number of available lines

B[i] : upload transfer rate of i-th line

S : sum of upload transfer rates for respective lines

D : value obtained by dividing maximum upload transfer rate, among upload transfer rates for respective lines, by minimum upload transfer rates $$M = K \times \frac{N}{D}$$

K : weight coefficient case1 > S > 3Mbps → K=25 case2 > S ≦ 3Mbps → K=10

W[i] : traffic distribution weight value of i-th line $$W[i] : B[i] \times \frac{M}{S}$$

METHOD AND SYSTEM FOR TRANSMITTING DATA USING TRAFFIC DISTRIBUTION FOR EACH LINE BETWEEN SERVER AND CLIENT CONNECTED BY VIRTUAL INTERFACE

TECHNICAL FIELD

The present invention relates, in general, to a method and system for transmitting data by distributing traffic to respective lines between a server and a client connected via a virtual interface, and, more particularly, to a method and system that transmit data by distributing data to respective lines using traffic distribution weights between a server and a client connected to each other via a virtual interface, thus maximizing data transmission efficiency, and that provide a method of rearranging received data packets and detecting errors on respective lines, thus improving the data transmission efficiency of a user.

BACKGROUND ART

Recently, with the development of Internet communication and network technology, the communication technology field has been developed very rapidly. Alongside such a development, the amount of data communication used between users has also greatly increased. Accordingly, the development of a system capable of transmitting a larger amount of data for a shorter time has now been highlighted as an important subject.

One of important factors in data transmitting is the data transfer rate. Data transfer rate refers to the amount of digital data transferred from one location to another location over a given time (generally, per second). Generally, the wider the bandwidth of a given path is, the higher the data transfer rate is. Data transmission in communication is typically measured in Bits Per Second (BPS). For example, the typical rate of Internet access by using a modem is about 56 Kbps, and the rate of data transmission conducted through a local area network, such as the Ethernet, is about 10 Mbps.

Another important factor in data transmission, together with the data transfer rate, is the number of lines through which data can be transmitted. The term "line" refers to, in brief, a path along which data is transferred when data transmission is performed between respective devices. For sure, it is apparent that a method of dividing and transmitting data using a plurality of lines improves the data transfer rate compared to a method of transmitting data using a single line.

In a case of transmitting data between a server and a client where equivalent lines through are exist between the server and the client, the prior art generally uses a method of distributing data packets having same amount of data into the existing equivalent lines. For example, if there are four lines and data composed of eight packets exists, the prior art uses a method of transmitting data by distributing two packets to each line. Alternatively, the prior art may use a method of setting a distribution ratio of data packets for respective lines through the user's manual manipulation and distributing data packets for respective lines using the distribution ratio.

However, when a plurality of lines are present between the server and the client, the bandwidths of the respective lines are not identical to each other, so that transfer rates for respective lines may be differently measured. As a result, when data packets having the same amount of data are distributed to the plularity of lines, as in the case of the prior art, there is a problem in that the maximum efficiency in data transfer rate cannot be realized.

Meanwhile, the distribution of data packets through the user's manual manipulation is also limited in that the bandwidths of respective lines are not always maintained at uniform values but may be varied due to changes in the surrounding environment or the like, so that distributing data packets are not always efficiently.

DISCLOSURE OF INVENTION

Technical Problem

Accordingly, the present invention has been made keeping in mind the above problems, and an object of the present invention is to provide a method and system which are able to set traffic distribution weights in real time based on the bandwidths of respective lines and the characteristics of packets, and distribute and transmit data packets using the traffic distribution weights, when data is transmitted through respective lines between a server and a client, so that wider bandwidth utilization can be ensured, thus maximizing efficiency and transfer rate in transmitting data.

Another object of the present invention is to provide a method and system which are able to set traffic distribution weights for respective lines between a server and a client more efficiently and automatically.

A further object of the present invention is to provide a method and system which are able to rearrange received data packets in the order of the original transmission sequence of the data packets when a server and a client receive data packets, thus improving the stability and reliability of data transmission, and which are able to monitor periodically the communication status of physical interfaces related with a virtual interface, thus easily overcoming communication failures.

Technical Solution

In accordance with an aspect of the present invention to accomplish the above objects, there is provided a method of transmitting data by distributing traffic to respective lines between a server and a client connected to each other via a virtual interface provided for at least one line, comprising: a first step of the client transmitting a bandwidth test request signal to the server; a second step of the server transmitting a test request approval signal to the client in response to the bandwidth test request signal; a third step of the client conducting a bandwidth test measuring download transfer rates and upload transfer rates for respective lines connected to the server; a fourth step of the client transmitting results of the bandwidth test to the server; a fifth step of the server setting first traffic distribution weights, which is used to transmit data from the server to the client, using the results of the bandwidth test; a sixth step of the client setting second traffic distribution weights, which is used to transmit data from the client to the server, using the results of the bandwidth test; and a seventh step of the server distributing data to respective lines depending on the first traffic distribution weights and transmitting the distributed data to the client via a virtual interface and the respective lines, and the client distributing data to respective lines depending on the second traffic distribution weights and transmitting the distributed data to the server via a virtual interface and the respective lines.

Preferably, at the fourth step, the transmitted results of the bandwidth test are download transfer rates from the server for respective lines connected to the server, the download transfer rates being measured by the client.

Further, the fifth step may be performed such that first traffic distribution weights W[i] for respective lines are obtained using an equation W[i]=B[i]*M/S (where W[i] is a traffic distribution weight of an i-th line, B[i] is an upload transfer rate of the i-th line based on results of the bandwidth test, M is K*N/D [K is a weight coefficient, N is a number of lines between the server and the client, and D is a value obtained by dividing a maximum value of upload transfer rates for respective lines between the server and the client by a minimum value thereof], and S is a sum of the upload transfer rates for respective lines between the server and the client), and the first traffic distribution weights are set for respective lines by converting respective values of W[i] into a ratio of natural numbers.

Further, the setting of the first traffic distribution weights for respective lines by converting the values of W[i] into a ratio of natural numbers may be performed to convert the respective values of W[i] into the ratio of natural numbers by rounding off the values of W[i].

Further, the sixth step may be performed such that second traffic distribution weights W[i] for respective lines are obtained using an equation W[i]=B[i]*M/S (where W[i] is a traffic distribution weight of an i-th line, B[i] is an upload transfer rate of the i-th line based on results of the bandwidth test, M is K*N/D [K is a weight coefficient, N is a number of lines between the server and the client, and D is a value obtained by dividing a maximum value of upload transfer rates for respective lines between the server and the client by a minimum value thereof], and S is a sum of the upload transfer rates for respective lines between the server and the client), and the second traffic distribution weights are set for respective lines by converting respective values of W[i] into a ratio of natural numbers.

Further, the setting of the second traffic distribution weights for respective lines by converting the values of W[i] into a ratio of natural numbers may be performed to convert the respective values of W[i] into the ratio of natural numbers by rounding off the values of W[i].

Further, the seventh step may be performed such that each of the server and the client divides data into one or more data packets via the virtual interface thereof, distributes the data packets to respective lines depending on the first and second traffic distribution weights, and transmits the distributed data packets through the virtual interface and the respective lines.

Further, the seventh step may comprise the step of comparing a last time at which a packet is received through each line with a current time, checking the difference between the last time and the current time for each line, and blocking the line of which the difference is equal to or greater than a predetermined time.

Further, the method may further comprise, after the seventh step, an eighth step of the server and the client respectively rearranging one or more received data packets.

Preferably, the data packets are compressed and transmitted.

Preferably, the eighth step may comprise the steps of: 8-1) detecting sequence information included in each of the received data packets; 8-2) comparing the sequence information of the received data packet with predicted sequence information; 8-3) as a result of comparison at step 8-2), when the sequence information is identical to the predicted sequence information, storing the received data packet and increasing the predicted sequence information by 1, when the sequence information is less than the predicted sequence information, storing the received data packet, and when the sequence information is greater than the predicted sequence information, storing the received data packet in a packet queue; and 8-4) storing a data packet of which sequence information is identical to the predicted sequence information among pieces of sequence information of data packets included in the packet queue at regular periods, and increasing the predicted sequence information by 1.

In accordance with another aspect of the present invention, there is provided a data transmission system, including a server and a client for transmitting data by distributing traffic to respective lines via a virtual interface provided for at least one line, each of the server and the client comprising: a bandwidth test conduction unit for conducting a bandwidth test to measure transfer rates for respective lines; a traffic distribution weight setting unit for setting traffic distribution weights for respective lines using results of the bandwidth test for respective lines; and a data transmission/reception unit for distributing data to respective lines depending on the set traffic distribution weights, thus transmitting the distributed data.

Preferably, each of the server and the client may further comprise a data packet distribution unit for distributing data packets to respective lines depending on the traffic distribution weights in a case where the data is divided into one or more data packets and the data packets are transmitted through respective lines and a virtual interface.

Further, each of the server and the client may further comprise a data transmission error detection unit for comparing a last time at which a packet is received through each line with a current time, checking the difference between the last time and the current time for each line, and blocking the line of which the difference is equal to or greater than a predetermined time in a case where the data is divided into one or more data packets and the data packets are transmitted through respective lines and the virtual interface.

Preferably, each of the server and the client further comprises a data packet rearrangement unit for rearranging one or more packets received by the server or the client after the data is divided into one or more data packets and the data packets are transmitted through respective lines and the virtual interface.

Advantageous Effects

The present invention can provide a method and system which are able to set traffic distribution weights in real time based on the bandwidths of respective lines and the characteristics of packets, and distribute and transmit data packets using the traffic distribution weights, when data is transmitted through respective lines between a server and a client, so that wider bandwidth utilization can be ensured, thus maximizing efficiency and transfer rate in transmitting data.

Further, the present invention can provide a method and system which are able to set traffic distribution weights for respective lines between a server and a client more efficiently and automatically.

In addition, the present invention can provide a method and system which are able to rearrange received data packets in the order of the original transmission sequence of the data packets when a server and a client receive data packets, thus improving the stability and reliability of data transmission, and which are able to monitor periodically the communication status of physical interfaces related with a virtual interface, thus easily overcoming communication failures.

BEST MODE FOR CARRYING OUT THE INVENTION

Hereinafter, embodiments of the present invention will be described in detail with reference to the attached drawings.

Figure 1:
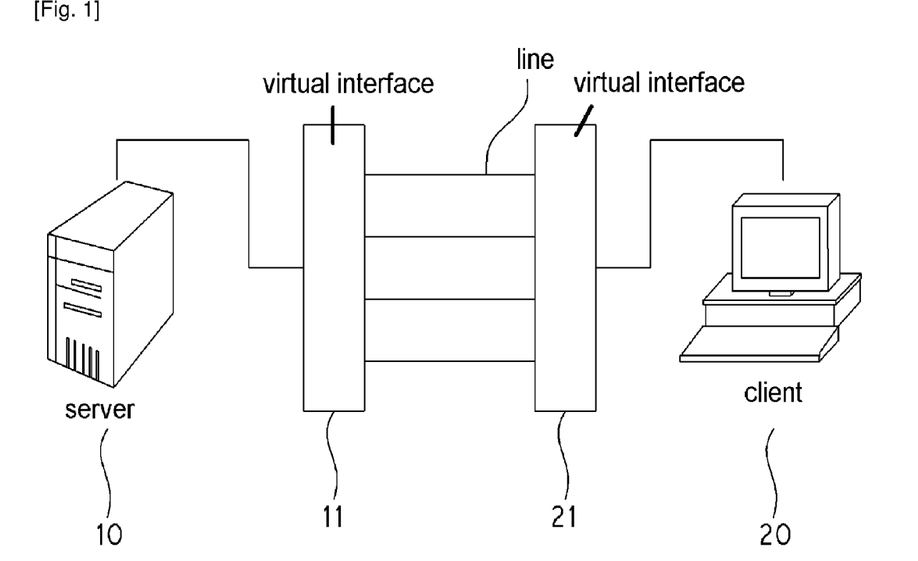
FIG. 1 is a diagram showing the entire construction of a system for transmitting data via a virtual interface according to an embodiment of the present invention.

FIG. 1 is a diagram showing the entire system for transmitting data via a virtual interface according to an embodiment of the present invention.

Referring to FIG. 1, the system according to the present embodiment includes a server 10 and a client 20. The server 10 and the client 20 are connected to each other via a virtual interface 11, including a physical interface on the side of the server 10, and a virtual interface 21, including a physical interface on the side of the client 20.

The server 10 in the present embodiment transmits or receives data to or from the client 20 via respective virtual interfaces 11 and 21. When the server 10 transmits or receives data packets to or from the client 20, the client 20 conducts a bandwidth test for each Internet line connected to the server 10, and transmits the results of the test to the server 10, thus allowing the server 10 to set traffic distribution weights using the results of the bandwidth test. Accordingly, the server 10 transmits data packets to the client 20 by distributing the data packets depending on the set traffic distribution weights, thus improving efficiency and transfer rate.

The client 20 is also connected to the server 10 via the virtual interfaces 11 and 21 and is configured to transmit or receive data therethrough. When the transmission of data from the client 20 to the server 10 is performed, data transmission is performed through the same process as that of the server. However, there is a functional difference in that, when a bandwidth test for each line between the server 10 and the client 20 is conducted, the client 20 transmits a bandwidth test request signal to the server, and the server transmits a bandwidth test approval signal to the client 20 upon receiving the request signal from the client 20.

The reason for conducting a bandwidth test for each line between the server 10 and the client 20 is to set traffic distribution weights used for data transmission from the server 10 to the client 20 and data transmission from the client 20 to the server 10. In order to set the traffic distribution weights, the upload transfer rate of the server 10 and the upload transfer rate of the client 20 are respectively required. The measurement of download and upload transfer rates is performed using total bytes transmitted and total bytes received via the interfaces of respective lines. In order to obtain upload transfer rates for respective lines from the client 20 to the server 10, the start time and end time of upload from the client 20 to the server 10 are stored, variation in bytes transmitted via the interfaces of respective lines is obtained, and thereafter upload transfer rates are calculated using the variation.

Here, the download transfer rates for respective lines between the client 20 and the server 10, which are measured by the client 20, are consequently equal to the upload transfer rates of the server 10. The server 10 sets traffic distribution weights using the download transfer rates transmitted from the client 20. Since the server 10 can simultaneously measure bandwidths with a plurality of clients 20, it is impossible to measure precise upload transfer rates using only variation in the bytes transmitted through respective lines on the side of the server 10, and thus the upload transfer rates of the server 10 are obtained by receiving the download transfer rates measured by the client 20. The detailed construction of the server 10 and the client 20 will be described in detail with reference to FIG. 2.

The virtual interfaces 11 and 21 comprise the virtual interface 11 on the side of the server 10 and the virtual interface 21 on the side of the client 20. The virtual interfaces 11 and 21, respectively placed on the sides of the server 10 and the client 20, are connected to each other through Internet lines.

The term "virtual interfaces 11 and 21" means a imaginary interface, which is composed of at least one physical interface (Internet line) but which does not physically exist. The virtual interfaces 11 and 21 functions to allow a user to control all operations and to efficiently distribute traffic when transmitting data by gathering physical interfaces on a single virtual place. The virtual interfaces 11 and 21 is characterized in that it transmits or receives data packets to or from a program in a user space, without transmitting or receiving data packets to or from physical media. The virtual interfaces 11 and 21 of the present invention may be implemented by using, for example, TAP devices. Tap device is a kind of virtual interface 11 or 21, and functions to communicate with the other party connected thereto by enabling the transmission/reception of data packets between a physical interface and a user application. The types of virtual interface for performing such a function include TUN, PPP, etc. Since the TAP device has the form of an Ethernet interface, there is an advantage in that Address Resolution Protocol (ARP) query is possible.

Figure 2:
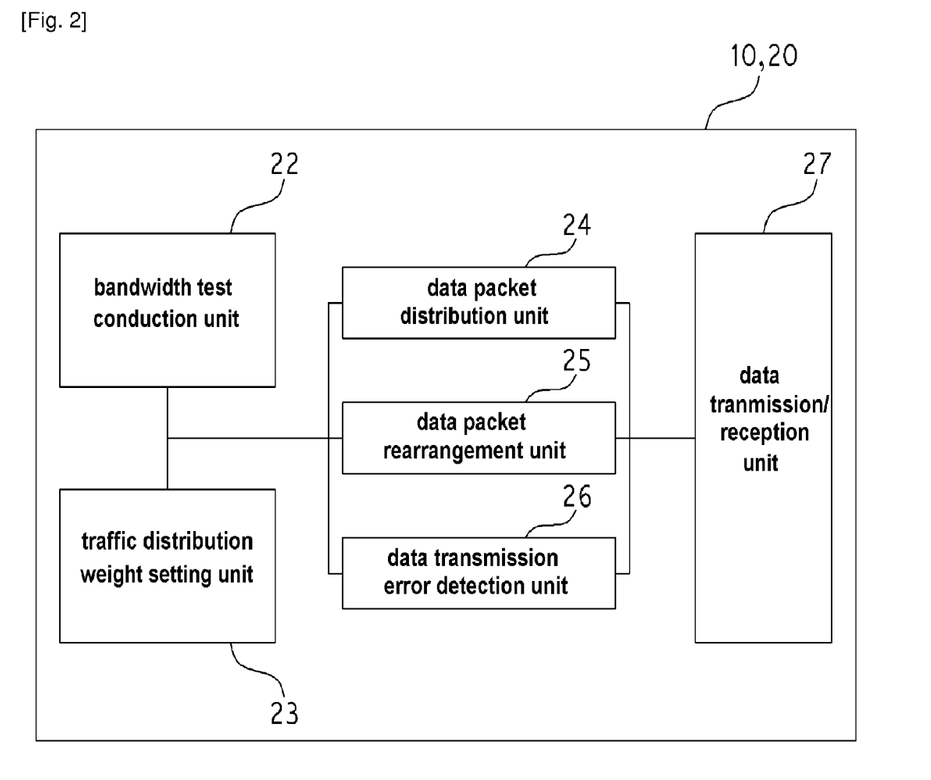
FIG. 2 is a diagram showing an embodiment of the detailed construction of a server 10 and a client 20.

FIG. 2 is a diagram showing an embodiment of the detailed construction of the server 10 and the client 20.

Referring to FIG. 2, each of the server 10 and the client 20 includes a bandwidth test conduction unit 22, a traffic distribution weight setting unit 23, a data packet distribution unit 24, a data packet rearrangement unit 25, a data transmission error detection unit 26, and a data transmission/reception unit 27, wherein respective units are connected to each other so that they can exchange data with each other.

The bandwidth test conduction unit 22 is a means for measuring transfer rates for respective lines connected between the client 20 and the server 10. One of the principal features of the present invention is that a bandwidth test is conducted for each line, traffic distribution weights are set based on the results of the test, and data packets are distributed depending on the set traffic distribution weights, and are then transmitted. Here, the bandwidth test for each line is conducted so as to obtain respective upload transfer rates of the client 10 and server 20, which are values required to obtain traffic distribution weights.

The bandwidth test begins when the client 20 requests a bandwidth test from the server 10. As described above with reference to FIG. 1, the bandwidth test is conducted such that the start time and end time of upload/download are stored, variation in bytes transmitted/received via the interfaces of respective lines is obtained, and the upload/download transfer rates are obtained using the variation. Since the server 10 can simultaneously measure bandwidths with a plurality of clients 20, it is impossible to precisely measure upload transfer rates using only the variation in bytes transmitted through respective lines on the side of the server 10. Accordingly, the download transfer rates measured by the client 20 are transmitted to the server 10, and thus the upload transfer rates of the server 10 are obtained.

As a result of the bandwidth test conducted by the bandwidth test conduction unit 22, the server 10 and the client 20 can recognize their upload transfer rates, which are used to set first and second traffic distribution weights by the traffic distribution weight setting unit 23, which will be described later.

The traffic distribution weight setting unit 23 is a means for setting traffic distribution weights, which is a reference to how to distribute data when data is transmitted through each line, by using the results of the bandwidth test of each line conducted by the bandwidth test conduction unit 22. The traffic distribution weights include first traffic distribution weights which is used when data is transmitted from the server 10 to the client 20, and second traffic distribution weights which is used when data is transmitted from the client 20 to the server 10. The traffic distribution weights may be set by the equation of FIG. 4, and a detailed procedure for setting the traffic distribution weights will be described in detail later with reference to FIGS. 3 and 4.

The data packet distribution unit 24 is a means functioning to distribute data packets to respective lines when data transmission is performed between the server 10 and the client 20 using the first and second traffic distribution weights set by the traffic distribution weight setting unit 23. A detailed procedure for distributing and transmitting data packets will be described in detail later with reference to FIG. 5.

The data packet rearrangement unit 25 is a means for allowing the client 20 or the server 10 to receive data packets from the server 10 or the client 20 and to rearrange the data packets according to the order of original sequence. Even if the data packets are distributed to and transmitted through respective lines using the set traffic distribution weights, the times at which data packets arrive through the lines may differ from each other regardless of bandwidths. Therefore, in order to get the received data packets in order, there is a need to rearrange received data packets in the order of original sequence. A procedure for rearranging the received data packets according to the order of original sequence will be described in detail later with reference to FIG. 6.

The data transmission error detection unit 26 is a means for detecting a faulty line in which a communication failure happens at the time of transmitting data through respective lines connected between the server 10 and the client 20, and blocking the faulty line. As describe above, one of the principal characteristics of the present invention is that, after the bandwidths of respective lines connected between the server 10 and the client 20 are measured, traffic distribution weights are set using the measured bandwidths, and data packets are distributed to respective lines using the traffic distribution weights, and are then transmitted. However, after the traffic distribution weights are set, a communication failure may occur on any line during the transmission of data through respective lines, and thus it is possible to exist a line which can not transmit data packets.

When there is a line having a communication failure, if the detection of errors on such a line and the overcoming of the communication failure are not performed, data packets will be continuously transmitted through the line having a communication failure, and the server 10 or the client 20, which is scheduled to receive packets, cannot receive the packets transmitted through the line having a communication failure. Accordingly, there is a problem in that complete transmission of data is not performed. In order to solve the above problem, the data transmission error detection unit 26 functions to block a line through which data packets are not transmitted for a pre-determined time and to prevent data packets from being transmitted through the line. A detailed error detection procedure performed by the data transmission error detection unit 26 will be described in detail with reference to FIG. 6.

The data transmission/reception unit 27 is a means functioning to enable the transmission/reception of data when data transmission is performed between the server and the client. The data transmission/reception unit 27 receives information about the distribution of packets for respective lines from the data packet distribution unit 24, distributes the data packets to respective lines depending on the information, and then transmits the data packets. If it is determined that rearrangement of the data packets is required when the data transmission/reception unit 27 receives the data packets from the server 10 and the client 20, the data transmission/reception unit 27 transmits the received data packets to the data packet rearrangement unit 25, and then the data packet rearrangement unit 25 rearranges the data packets of which the order are changed. Further, when a line in which a communication failure occurred is detected through the procedure for detecting errors in respective lines, the data transmission error detection unit 26 transmits information about the faulty line to the data transmission/reception unit 27, and the data transmission/reception unit 27 does not transmit data packets through the faulty line, thus overcoming such a failure. Further, the data transmission/reception unit 27 may compress data packets and transmits compressed data packets when transmitting the data packets through respective lines, thus ensuring wider bandwidth utilization for respective lines. When receiving the compressed packets, the data transmission/reception unit 27 decompresses the compressed packets, and then transmits the data packets to the data packet rearrangement unit 25.

Figure 3:
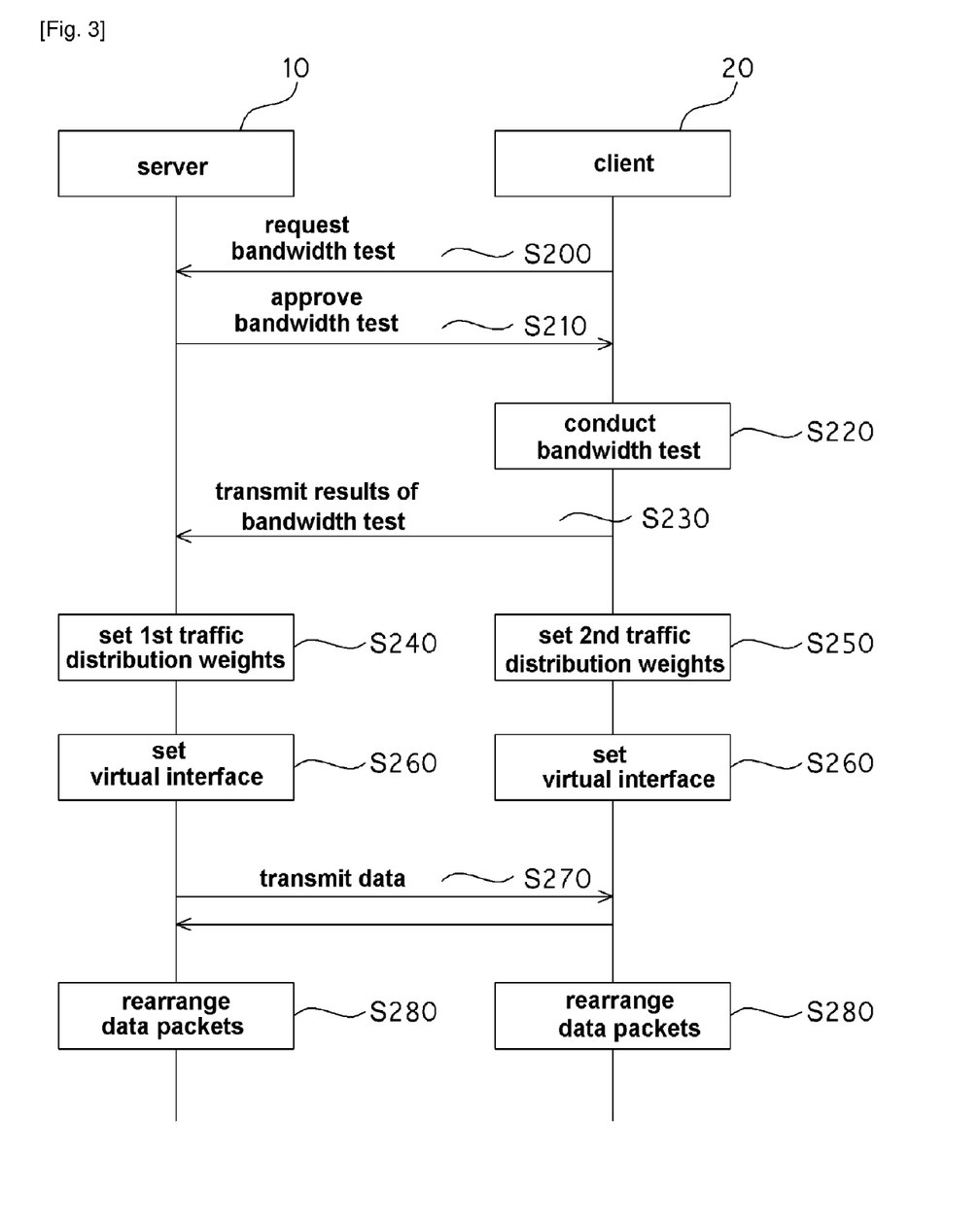
FIG. 3 is a flowchart showing an embodiment of a process for transmitting data between the server 10 and the client 20.

FIG. 3 is a flowchart showing an embodiment of a process for transmitting data between the server 10 and the client 20.

Referring to FIG. 3, before the transmission of data between the server 10 and the client 20 is performed, the client 20 transmits a bandwidth test request signal to the server 10 at step S200. The server 10, having received the bandwidth test request signal from the client 20, transmits a bandwidth test approval signal to the client 20 at step S210. The client 20, having received the bandwidth test approval signal from the server 10, conducts a bandwidth test for respective lines connected to the server 10 via the virtual interface at step S220.

The client 20, having conducted the bandwidth test, transmits the results of the bandwidth test to the server, thus sharing information with the server at step S230. The bandwidth test conducted by the client 20 can be performed by measuring upload transfer rates and download transfer rates for respective lines connected to the server 10.

In order to obtain first traffic distribution weights, which will be described later, upload transfer rates for uploading from the client 20 to the server 10 are required, and in order to obtain second traffic distribution weights, upload transfer rates for uploading from the server 10 to the client 20 are required. The upload transfer rates, obtained as the results of the bandwidth test conducted by the client 20 at step S220, are used to obtain the first traffic distribution weights. The download transfer rates with the server 10, obtained by the client 20, consequently correspond to the upload transfer rates for uploading from the server 10 to the client 20, and thus the server 10 obtains the second traffic distribution weights using the upload transfer rates received from the client 20.

Here, the reason that the server 10 uses the results received from the client 20 without directly measuring the upload transfer rates for uploading from the server 10 to the client 20 is that it is hard to precisely measure upload transfer rates by using only variation in bytes transmitted through respective lines on the side of the server 10 because the server 10 can simultaneously measure bandwidths with a plurality of clients 20, as described above. Therefore, the client 20 measures download transfer rates from the server 20 and transmits the download transfer rates to the server 10 and the upload transfer rates of the server 10 is obtained.

As described above, when the client 20 transmits the results of the bandwidth test to the server, the server sets first traffic distribution weights which is to be used in transmitting data from the server 10 to the client 20, by using the download transfer rates for downloading from the client 20 to the server 10, obtained from the results of the bandwidth test at step S240.

The client 20 also sets second traffic distribution weights, used in transmitting data from the client 20 to the server 10, by using the upload transfer rates measured by the client 20 at step S250. The first and second traffic distribution weights are determined through a calculation process performed by the traffic distribution weight setting unit 23 provided in each of the server 10 and the client 20. The first and second traffic distribution weights are consequently intended to improve data transmission efficiency and they may be determined by obtaining the ratio of natural numbers most similar to the value of the upload transfer rates for respective lines. Since the ratio of actual upload transfer rates is not measured as the ratio of exact natural numbers, such as 122 bps or 156 bps, there is a need to convert the ratio of upload transfer rates for respective lines into the ratio of natural numbers using a specific equation as in the case of the present invention.

An example of the procedure for setting the first and second traffic distribution weights is described with reference to FIG. 4. The traffic distribution weights are set in such a way that first and second traffic distribution weights W[i] for respective lines are obtained using, for example, an equation W[i]=B[i]*M/S (where W[i] is the traffic distribution weight of an i-th line, B[i] is the upload transfer rate of the i-th line based on the results of the bandwidth test, M is K*N/D [K is a weight coefficient, N is the number of lines between the server and the client, and D is a value obtained by dividing the maximum value of the upload transfer rates for respective lines between the server and the client by the minimum value thereof], and S is the sum of the upload transfer rates for respective lines between the server and the client), and thus the first and second traffic distribution weights can be set for respective lines by converting the respective values of W[i] into a ratio of natural numbers. In this case, K is the weight coefficient, and the ratio of natural numbers most similar to the ratio of actual transfer rates can be obtained under the condition that K has a value of 25 when S is greater than 3 Mbps, and has a value of 10 when S is equal to or less than 3 Mbps, as the results of various tests.

As an example of the process for obtaining traffic distribution weights, the case where two lines are present, and upload transfer rates for the lines are 308 kbps and 605 kbps, respectively, is considered.

N=2, B[0]=308, B[1]=605, S=913

D=605/308=1.964286

M=K*N/D (since S is less than 3 Mbps, K=10)

=10*2/1.964286=10.181817

W[0]=B[0]*M/S=308*10.181817/913=3.434823=3

W[1]=B[1]*M/S=605*10.181817/913=6.746987=7

In this case, the distribution of data packets is realized as the ratio of natural numbers, and thus traffic distribution weights must also be represented by the ratio of natural numbers. Several methods can be used as methods of converting values of W[i], other than natural numbers, into natural numbers, but, in this embodiment, rounding off method is used to form natural numbers. As a result of the calculation above, a ratio of the traffic distribution weights of 3:7 is obtained. Since the ratio of the traffic distribution weights of 3:7 is obtained, the data packets are divided by the ratio of 3:7 for respective lines, and are then transmitted by the ratio of 3:7. A more detailed procedure for distributing and transmitting data packets will be described below.

As another example of the method for obtaining traffic distribution weights, the case where three lines are present, and upload transfer rates for the lines are 2300 kbps, 3100 kbps, and 4900 kbps, respectively, is considered.

N=3, B[0]=2300, B[1]=3100, B[2]=4900, S=10300

D=4900/2300=2.130434

M=K*N/D (since S is greater than 3 Mbps, K=25)

=25*3/2.130434=35.204094

W[0]=B[0]*M/S=2300*35.204094/10300=7.861108=8

W[1]=B[1]*M/S=3100*35.204094/10300=10.595406=11

W[2]=B[1]*M/S=4900*35.204094/10300=16.747578=17

As a result of the calculation of the traffic distribution weights, a ratio of distribution weights for respective lines is 8:11:17. The ratio of actual upload transfer rates, that is, 2300:3100:4900, is about 1:1.348:2.130, and 8:11:17 is about 1:1.375:2.125, and thus it can be seen that there is no large difference between the ratio of actual transfer rates and the traffic distribution weights obtained according to the present invention.

As a further example of the setting of traffic distribution weights, the case where three lines are present, and traffic distribution weights, obtained before they are formed in the ratio of natural numbers, are 0.25, 1.2, and 1.8, is considered. As described above, when the traffic distribution weights are rounded off and are formed as natural numbers, 0, 1, and 2 are obtained. Since the weights must be natural numbers, there is a problem in that, when rounding off is performed as described above, a weight of 0 is obtained. Therefore, in the above case, a value, multiplied to convert a weight of 0.25 less than 1 into 1, that is, 4.0, is also multiplied by 1.2 and 1.8. Then, the ratio of weights is 1:4.8:7.2, and the weights are rounded off, and thus the traffic distribution weights having a ratio of 1:5:7 can be obtained.

When the first and second traffic distribution weights are set by the server 10 and the client 20 at steps S240 and S250, the server 10 and the client 20 generate respective virtual interfaces 11 and 21, each including physical interfaces, at step S260. As described above with reference to FIG. 1, the term "virtual interfaces 11 and 21" means a imaginary interface, which is composed of at least one physical interface (Internet line) but which does not physically exist. The virtual interfaces 11 and 21 function to allow the user to control all operations and to efficiently distribute traffic when transmitting data by gathering the physical interfaces on a single place.

When the first and second traffic weights are set, the server 10 and the client 20 generate virtual interfaces at steps S240, S250 and S260, and thereafter transmit data by distributing data packets to respective lines at step S270. When data is transmitted from the server 10 to the client 20, data packets are distributed to respective lines depending on the first traffic distribution weights and are then transmitted through the lines. When data is transmitted from the client 20 to the server 10, data packets are distributed to respective lines depending on the second traffic distribution weights, and are then transmitted through the lines.

Algorithms for distributing and transmitting data packets may include a Round Robin (RR) algorithm, a Weighted Round Robin (WRR) algorithm, a broadcast algorithm, etc. According to the Round Robin(RR) algorithm, data packets are sequentially distributed to respective lines without considering traffic distribution weights. According to the Weighted Round Robin(WRR) algorithm, data packets are sequentially distributed in consideration of traffic distribution weights as in the case of the present invention. According to the broadcast algorithm, the same data packets are sent to all physical interfaces participating in a virtual interface simultaneously. In the case of packets, such as a Transmission Control Protocol (TCP) ACK packet, a User Datagram Protocol (UDP) packet, an Address Resolution Protocol (ARP) request/response packet, etc., great importance must be placed on transfer rate rather than bandwidth, and thus the data packets are generally transmitted by the broadcast algorithm. According to the present invention, data packets, other than the TCP ACK packet, the UDP packet, and the ARP request/response packet, are transmitted using a distribution method based on traffic distribution weights.

An example in which the server 10 distributes data packets depending on first traffic distribution weights and transmits the distributed data packets to the client 20 is described below with reference to FIG. 5. The data intended to be transmitted by the server 10 is divided into data packets, and the data packets are transmitted to the client 20 via the virtual interface 11. At this time, the data packets are distributed by the ratio of the first traffic distribution weights of respective lines, and are then transmitted to the client 20.

A process for transmitting data packets by distributing the data packets to respective lines is described below. First, line numbers are defined for respective lines, and first traffic distribution weights having natural numbers are input. Then, the data packets are sequentially distributed to respective lines in the sequence of the defined line numbers. Here, when a data packet is distributed to a given line, a weight input to the line is decreased by 1. A data packet is not distributed to a line of which the weight is '0'. Further, after a data packet is distributed to a line having the last line number, the sequence is returned to a line having the first line number, and a subsequent data packet is distributed to that line, through the above-described process. Further, when all traffic distribution weights, input to respective lines, become '0', an initial traffic distribution weight is input again to each line, and then the above packet distribution process is repeated.

Through the above-described process, the data packets from the server 10 to the client 20 are distributed to respective lines depending on the first traffic distribution weights, and are then transmitted through respective lines. This process is described below with reference to FIG. 5. Data transmitted from the server 10 is composed of 10 packets, which have packet numbers ranging from 1 to 10 according to the sequence of transmission. The server 10 and the client 20 are connected to each other through four lines via the virtual interfaces 11 and 22. The four lines sequentially have line numbers 1, 2, 3, and 4 in a direction from above to below, and traffic distribution weights of W[1]=1, W[2]=2, W[3]=3, and W[4]=4 are input to the four lines, respectively.

The data packets starting from a first packet are sequentially distributed to respective lines, and the first packet is distributed to the first line. Since the first line receives a single packet, the weight of the first line is changed from 1 to 0, and is then stored. A second packet is distributed to a second line, and the weight of the second line is changed from 2 to 1. A third packet and a fourth packet are distributed to third and fourth lines, respectively, using the same method, and the weights of the third and fourth lines are changed to 2 and 3, respectively, and are then stored. When a single packet is distributed to each line, the process returns to the initial state, and is repeated. However, since the first packet is input to the first line, and the weight of the first line becomes '0', a fifth packet is distributed to the second line, not the first line. Similarly, sixth and seventh packets are distributed to third and fourth lines, respectively. After the distribution of packets leading to the seventh packet has been completed, the weights of the second, third and fourth lines are changed to 0, 1, and 2, respectively, and are then input to the lines. Finally, the remaining eighth, ninth and tenth packets are distributed to third and fourth lines, respectively, through the above-described procedure. Through the above process, the distribution of all packets leading to the tenth packet is completed. The 10 data packets are distributed to respective lines ranging from the first to fourth lines depending on the traffic distribution weights for respective lines, and are then transmitted to the client 20. Here, when the transmission of data packets is performed between the server and the client, the data packets may be compressed and transmitted. When data packets are compressed, and the compressed packets are transmitted depending on traffic distribution weights, bandwidth much wider than the actual bandwidth of each line can be ensured.

Again, referring back to FIG. 3, after the data transmission procedure between the server 10 and the client 20 has been terminated at step S270, the client 20 or the server 10, which receives the data packets from the server 10 or the client 20, examines whether the received data packets are packets requiring rearrangement and whether the data packets are compressed data packets. When the received data packets do not require sequence rearrangement, the data packets are immediately processed without performing a procedure for comparing the sequence of the packets. When the received packets are compressed packets, a procedure for decompressing the compressed data is primarily performed before typical data packet processing is performed.

When it is determined that the received data packets require sequence rearrangement, the data packets are rearranged in the order of the original transmission sequence thereof through a packet rearrangement procedure at step S280. The procedure for rearranging received data packets in the server 10 or the client 20 is described below.

An example of the procedure for rearranging received data packets is described below. First, sequence information, included in a received data packet, is detected, and is compared to predicted sequence information. As a result of the comparison, when the sequence information is identical to the predicted sequence information, the received data packet is stored, and the predicted sequence information is increased by 1. When the sequence information is less than the predicted sequence information, the received data packet is stored. When the sequence information is greater than the predicted sequence information, the received data packet is stored in a packet queue (queue for temporarily storing data packets for the purpose of sequence rearrangement of data packets). And, the step of storing a data packet, of which the sequence information is identical to predicted sequence information, among pieces of sequence information of data packets stored in the packet queue, at regular periods, and increasing the predicted sequence information by 1, is performed, and thus the data packets are rearranged.

If a packet to be received is not permanently received (packet loss) or if the packet is received too late, the size of the packet queue is excessively increased, and the actual transmission of packets is not entirely performed. Accordingly, the timeout of the queue corresponding to a predetermined period (for example, 50 ms) may be designated.

When the above-described procedure for comparing predicted sequence information with the sequence information of the received packet is terminated, a queue scan is performed. The term 'queue scan' means an operation of comparing the sequence information of data packets, stored in the packet queue, with predicted sequence information, immediately using the packet, having the same sequence information as the predicted sequence information, for the configuration of data if there is the packet having the same sequence information is present, and increasing the predicted sequence information by 1. Further, queue scan also denotes the function of updating the predicted sequence information in the sequence of packets stored in the head of the packet queue when the queue timeout has elapsed. The queue scan can also be performed at regular periods even in the situation in which the transmission/reception of packets is not performed, as well as being performed in the above procedure. This is required to prevent data packets from being transmitted too late due to the continuation of the state in which data packets are stored in the packet queue when the transmission/reception of packets is scarcely performed.

Figure 6:
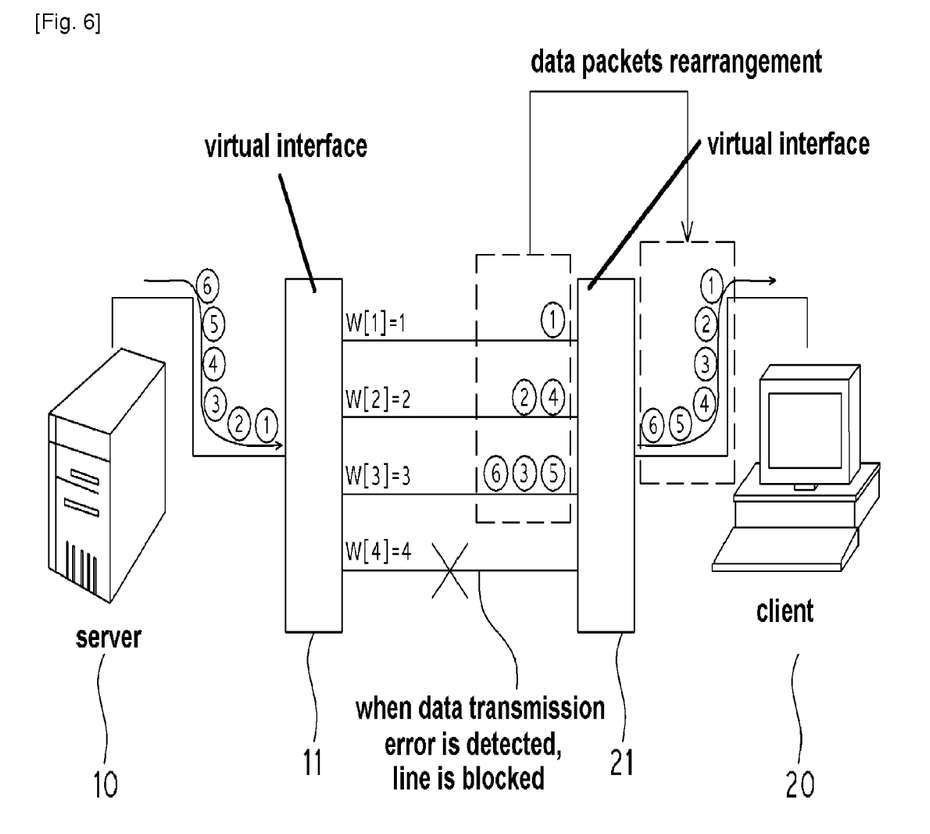
FIG. 6 is a diagram showing a procedure for blocking a faulty line at the time of detecting a data transfer error and a procedure for rearranging received data packets when data transmission is performed between the server 10 and the client 20.

With reference to FIG. 6, the process for rearranging data packets according to an embodiment of the present invention is described below. Referring to FIG. 6, the server 10 transmits data packets having sequence information ranging from 1 to 6 to the client 20 via the virtual interface 11. There are four lines ranging from the first line to fourth line between the server 10 and the client 20. However, as shown in FIG. 6, since an error is detected in the fourth line, and the fourth line is blocked, packets are not transmitted through the fourth line. A procedure for blocking a line having a data transmission error will be described later.

Consequently, first to sixth data packets are distributed to first, second and third lines depending on the weights of respective lines, as described above, and are transmitted through the lines. When the data packets are distributed to and transmitted through respective lines, the arrival sequence of the packets may be changed due to the surrounding situations of respective lines. In this case, received data packets are rearranged in the order of the original transmission sequence thereof through a procedure for rearranging the received data packets.

Referring to FIG. 6, it can be seen that, during the transmission of data packets through respective lines, the data packets arrive with the sequence of the packets having been changed. A data packet rearrangement procedure is described below on the assumption that the arrival sequence of the data packets is 1, 4, 5, 2, 3, and 6.

First, predicted sequence information will be the sequence of 1, 2, 3, 4, 5, and 6, which are numbers of data packets. Since the number of a first arriving packet is 1, and is identical to the number of the predicted sequence information, the first packet is immediately stored and is used to configure data, and the predicted sequence information is changed to 2. Next, a fourth packet arrives. Since it is greater than that of the predicted sequence information, the fourth packet is stored in the packet queue. Since a fifth packet arriving next, is also greater than 2, which is the number of the predicted sequence information, the fifth packet is also stored in the packet queue. Since a packet arriving next is a second packet, the number of which is identical to that of the predicted sequence information, it is immediately stored and used to configure data, and the predicted sequence information is changed to 3. Since a packet arriving next is a third packet, it is immediately stored, and the predicted sequence information is changed to 4.

As described above, after the procedure for comparing the predicted sequence information with packet numbers has been terminated, a procedure for comparing numbers of packets, stored in the packet queue, with predicted sequence information through a queue scan is performed. Since the fourth packet corresponding to the current predicted sequence information is stored in the packet queue, the fourth packet is used to configure data. After the fourth packet in the packet queue has been used, information of the packet queue is updated, and the predicted sequence information is changed to 5. In the updated packet queue, since the fifth packet corresponding to the predicted sequence information is also present, the fifth packet is also used to configure data through a queue scan. After the fifth packet has been used, the predicted sequence information is changed to 6. Since a number of a packet arriving next is 6, the sixth packet is immediately stored and is used to configure data.

By the rearrangement procedure described above, when the first to sixth packets transmitted from the server 10 are received by the client 20, they are rearranged in the order of the original transmission sequence.

Again, referring back to FIG. 3, after each of the server 10 and the client 20 performs the procedure for rearranging received data packets, they terminates the data reception procedure at step S280.

Figure 4:
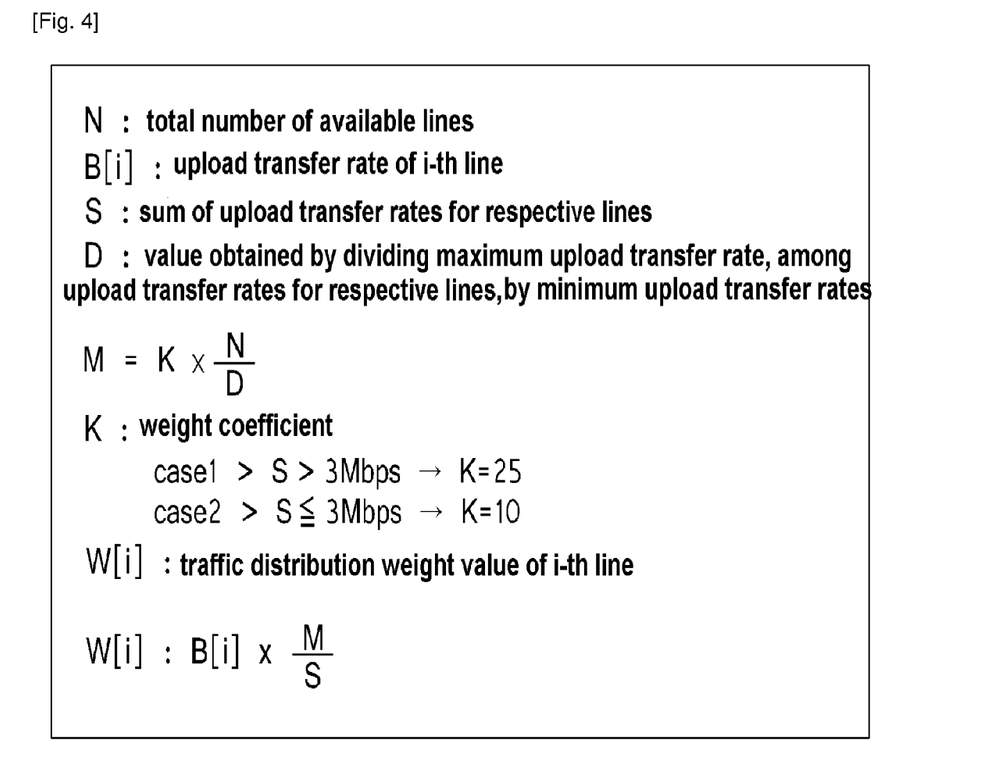
FIG. 4 is a diagram showing an embodiment of the setting of traffic distribution weights performed by the traffic distribution weight setting unit 23 of each of the server 10 and the client 20, as described with reference to FIG. 3.

FIG. 4 is a diagram showing an embodiment of the setting of traffic distribution weights performed by the traffic distribution weight setting unit 23 of each of the server 10 and the client 20, as described above with reference to FIG. 3.

As described above, the traffic distribution weight setting unit 23 sets the first and second traffic distribution weights using the equation of FIG. 4. The traffic distribution weights obtained using the equation of FIG. 4 can be changed so that they are represented by the form of natural numbers using a method, such as rounding off, ceiling, or flooring.

Figure 5:
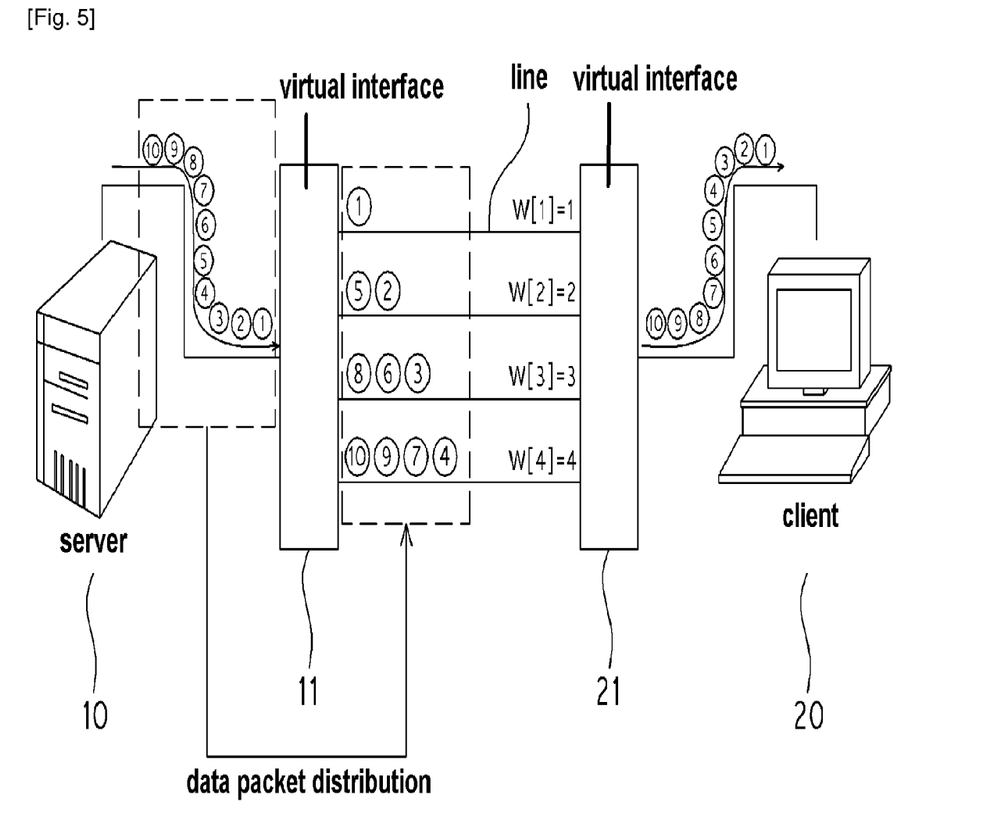
FIG. 5 is a diagram showing an embodiment of a procedure for distributing data packets when data transmission is performed between the server 10 and the client 20, as described with reference to FIG. 3.

FIG. 5 is a diagram showing an embodiment of a procedure for distributing data packets when data transmission is performed between the server 10 and the client 20, as described above with reference to FIG. 3.

As described above, respective lines receive values corresponding to the traffic distribution weights, so that data packets are distributed to in correspondence with the traffic distribution weights and transmitted through respective lines. Lines to which the data packets are distributed are determined through the processing performed by the data packet distribution unit 24 provided in each of the server 10 and the client 20.

FIG. 6 is a diagram showing a procedure for blocking a faulty line at the time of detecting a data transfer error and a procedure for rearranging received data packets when data transmission is performed between the server 10 and the client 20.

As described above, the data packets received from the server 10 or the client 20 are rearranged in the order of the original transmission sequence thereof through a data packet rearrangement procedure, and then is configured to the original data packets.

Each of the server 10 and the client 20 includes the data transmission error detection unit 26 for detecting a line in which a failure occurs at the time of transmitting data through the distribution of traffic to respective lines, and to block the detected line. As described above with reference to FIG. 2, when packets are not received through a line for a predetermined period of time or longer, the data transmission error detection unit 26 functions to block the line, thus preventing data packets from being transmitted through the line.

A procedure for detecting an error for each line, performed by the data transmission error detection unit 26 on the side of the client 20, is described below. The client 20 stores a last time at which any packet is transmitted through each line, regardless of whether the packet is an inspection packet for error detection or an actual data packet. The client 20 compares the last time, at which a packet is transmitted through each line, with a current time and transmits an inspection packet for error detection to the server 10 when the difference between the last time and the current time is equal to or greater than a predetermined time. Further, the client 20 stores a last time at which any packet is received through each line, regardless of whether the packet is a response to the inspection packet for error detection, or an actual data packet. The client 20 compares the last time at which a packet is received through each line, with a current time, and determines that the line is in a communication disabled state and blocks the line if the difference between the last time and the current time is equal to or greater than a predetermined time.

When the server 20 receives the inspection packet from the client 20, the data transmission error detection unit 26 of the server 10 transmits a response packet to the inspection packet to the client 20. The server 10 also stores a last time at which any packet is received through each line, and then determines that the line is in a communication disabled state and blocks the line if the difference between the last time at which the packet is received and a current time is equal to or greater than a predetermined time. The fourth line of FIG. 6 shows that it is blocked by the data transmission error detection unit 26. Since the fourth line is blocked, data packets are transmitted through first, second and third lines without being transmitted through the fourth line. A faulty line is blocked based on the detection of errors, thus improving the efficiency of data transmission, and additionally realizing an advantage in that the loss of data packets occurring through such a faulty line can be prevented.

Although the preferred embodiments of the present invention have been disclosed for illustrative purposes, those skilled in the art will appreciate that various modifications, variations and improvements are possible, without departing from the scope and spirit of the invention as disclosed in the accompanying claims and the attached drawings.

The invention claimed is:

1. A method of transmitting data by distributing traffic to respective lines between a server and a client connected to each other via a virtual interface provided for at least one line, comprising:
    a first step of the client transmitting a bandwidth test request signal to the server;
    a second step of the server transmitting a test request approval signal to the client in response to the bandwidth test request signal;
    a third step of the client conducting a bandwidth test measuring download transfer rates and upload transfer rates for the respective lines connected to the server;
    a fourth step of the client transmitting results of the bandwidth test to the server;
    a fifth step of the server setting first traffic distribution weights, which is used to transmit data from the server to the client, using the results of the bandwidth test;
    a sixth step of the client setting second traffic distribution weights, which is used to transmit data from the client to the server, using the results of the bandwidth test; and
    a seventh step of the server distributing data to the respective lines depending on the first traffic distribution weights and transmitting the distributed data to the client via the virtual interface and the respective lines, and the client distributing data to the respective lines depending on the second traffic distribution weights and transmitting the distributed data to the server via the virtual interface and the respective lines,
    wherein the fifth step is performed such that first traffic distribution weights $W[i]$ for the respective lines are obtained using an equation $w[i]=B[i]*M/S$ (where $w[i]$ is a traffic distribution weight of an i-th line, $B[i]$ is an upload transfer rate of the i-th line of the server based on results of the bandwidth test, $M$ is $K*N/D$ [$K$ is a weight coefficient, $N$ is a number of lines between the server and the client, and $D$ is a value obtained by dividing a maximum value of upload transfer rates for the respective lines between the server and the client by a minimum value thereof], and $S$ is a sum of the upload transfer rates for the respective lines between the server and the client), and the first traffic distribution weights are set for the respective lines by converting the respective values of $w[i]$ into a ratio of natural numbers.

2. The method according to claim 1, wherein, at the fourth step, the transmitted results of the bandwidth test are download transfer rates from the server for the respective lines connected to the server, the download transfer rates being measured by the client.

3. The method according to claim 1, wherein the setting of the first traffic distribution weights for the respective lines by converting the values of $W[i]$ into a ratio of natural numbers is performed to convert the respective values of $W[i]$ into the ratio of natural numbers by rounding off the values of $W[i]$.

4. The method according to claim 1, wherein the sixth step is performed such that second traffic distribution weights $W[i]$ for the respective lines are obtained using an equation $W[i]=B[i]*M/S$ (where $W[i]$ is a traffic distribution weight of an i-th line, $B[i]$ is an upload transfer rate of the i-th line based on results of the bandwidth test, $M$ is $K*N/D$ [$K$ is a weight coefficient, $N$ is a number of lines between the server and the client, and $D$ is a value obtained by dividing a maximum value of upload transfer rates for the respective lines between the server and the client by a minimum value thereof], and $S$ is a sum of the upload transfer rates for the respective lines between the server and the client), and the second traffic distribution weights are set for the respective lines by converting respective values of $W[i]$ into a ratio of natural numbers.

5. The method according to claim 4, wherein the setting of the second traffic distribution weights for the respective lines by converting the values of $W[i]$ into a ratio of natural numbers is performed to convert the respective values of $W[i]$ into the ratio of natural numbers by rounding off the values of $W[i]$.

6. The method according to claim 1, wherein the seventh step is performed such that each of the server and the client divides data into one or more data packets via the virtual interface thereof, distributes the data packets to the respective lines depending on the first and second traffic distribution weights, and transmits the distributed data packets through the virtual interface and the respective lines.

7. The method according to claim 6, wherein the seventh step comprises the step of comparing a last time at which a packet is received through each line with a current time, checking the difference between the last time and the current time for each line, and blocking the line of which the difference is equal to or greater than a predetermined time.

8. The method according to claim 6, further comprising, after the seventh step, an eighth step of the server and the client respectively rearranging one or more received data packets.

9. The method according to claim 6, wherein the data packets are compressed and transmitted.

10. The method according to claim 8, wherein the eighth step comprises the steps of:

detecting sequence information included in each of the received data packets;

comparing the sequence information of the received data packet with predicted sequence information;

as a result of comparison, when the sequence information is identical to the predicted sequence information, storing the received data packet and increasing the predicted sequence information by 1, when the sequence information is less than the predicted sequence information, storing the received data packet, and when the sequence information is greater than the predicted sequence information, storing the received data packet in a packet queue; and storing a data packet of which sequence information is identical to the predicted sequence information among pieces of sequence information of data packets included in the packet queue at regular periods, and increasing the predicted sequence information by 1.

* * * * *